US012459476B2

(12) United States Patent
Ahn et al.

(10) Patent No.: US 12,459,476 B2
(45) Date of Patent: Nov. 4, 2025

(54) ELECTRIC HYDRAULIC BRAKE (71) Applicant: HYUNDAI MOBIS Co., Ltd., Seoul (KR)

(72) Inventors: Sung Ki Ahn, Yongin-si (KR); Chun Sic Yun, Yongin-si (KR); Seung Hyun Yun, Yongin-si (KR); Byoung Woo Ha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 519 days.

(21) Appl. No.: 17/861,669

(22) Filed: Jul. 11, 2022

(65) Prior Publication Data

US 2023/0012180 A1 Jan. 12, 2023

(30) Foreign Application Priority Data

Jul. 12, 2021 (KR) .......................... 10-2021-0091227

(51) Int. Cl.
*B60T 13/74* (2006.01)
*B60T 8/88* (2006.01)
*B60T 13/14* (2006.01)

(52) U.S. Cl.
CPC ............ *B60T 13/745* (2013.01); *B60T 8/885* (2013.01); *B60T 13/142* (2013.01); *B60T 2270/413* (2013.01)

(58) Field of Classification Search
CPC . B60T 7/042; B60T 8/88; B60T 8/368; B60T 8/404; B60T 8/885; B60T 13/142;
(Continued)

(56) References Cited

U.S. PATENT DOCUMENTS

| 11,001,245 | B2* | 5/2021 | Dinkel | .................. B60T 13/161 |
| 2015/0130266 | A1* | 5/2015 | Kim | ....................... B60T 13/686 303/10 |

(Continued)

FOREIGN PATENT DOCUMENTS

| CN | 105752066 A | 7/2016 |
| CN | 111038470 A | 4/2020 |

(Continued)

OTHER PUBLICATIONS

Extended European Search Report Dec. 7, 2022, issued in corresponding European Patent Application No. 22183339.5-1012.
(Continued)

*Primary Examiner* — Robert A. Siconolfi
*Assistant Examiner* — San M Aung
(74) *Attorney, Agent, or Firm* — Morgan, Lewis & Bockius LLP (57) ABSTRACT

An electric hydraulic brake includes: wheel brakes configured to braking force to wheels of a vehicle; a reservoir storing brake oil; a master cylinder connected to the reservoir, and operated in conjunction with a main brake motor to generate pressure of the brake oil; a first controller configured to control the main brake motor; a hydraulic controller including a pump configured to form pressure of the brake oil in conjunction with an auxiliary brake motor, and a hydraulic block configured to selectively transmit the pressure of the brake oil formed in the master cylinder or the pump to the wheel brakes; and a second controller configured to control the auxiliary brake motor when the master cylinder or the first controller malfunctions. The hydraulic controller is provided with an auxiliary flow path to transmit the brake oil from the reservoir to the pump directly through the auxiliary flow path.

13 Claims, 4 Drawing Sheets

(58) Field of Classification Search
CPC .... B60T 13/166; B60T 13/662; B60T 13/665; B60T 13/686; B60T 13/745; B60T 17/22; B60T 2270/402; B60T 2270/403; B60T 2270/413
USPC ............................................................ 303/3
See application file for complete search history.

(56) References Cited

U.S. PATENT DOCUMENTS

| | | |
|---|---|---|
| 2016/0185329 A1 | 6/2016 | Lee et al. |
| 2018/0170334 A1* | 6/2018 | Loeffler ................ B60T 8/404 |
| 2020/0139948 A1 | 5/2020 | Leiber et al. |
| 2020/0216053 A1* | 7/2020 | Ahn ..................... B60T 13/167 |
| 2021/0122346 A1 | 4/2021 | Ahn |
| 2021/0146900 A1 | 5/2021 | Einig et al. |
| 2021/0221349 A1 | 7/2021 | Kim |

FOREIGN PATENT DOCUMENTS

| | | | | |
|---|---|---|---|---|
| DE | 102020103723 A1 * | 4/2021 | ............. | B60T 17/18 |
| KR | 10-2016-0123251 A | 10/2016 | | |

OTHER PUBLICATIONS

Office Action issued on Dec. 20, 2024 in Chinese Patent Application No. 202210808890.3 with English translation Note: U.S. Appl. No. 11/001,245 B2 and US 2021122346 A1 cited therein are already of record.

* cited by examiner

ELECTRIC HYDRAULIC BRAKE

CROSS-REFERENCE TO RELATED APPLICATIONS

This application is based on, and claims priority from, Korean Patent Application Number 10-2021-0091227, filed Jul. 12, 2021, the disclosure of which is incorporated by reference herein in its entirety.

TECHNICAL FIELD

The present disclosure relates to an electric hydraulic brake.

BACKGROUND

The content described in this section merely provides the background information on the present disclosure and does not constitute the prior art.

An electric hydraulic brake uses an electric motor to generate hydraulic pressure and transmits the hydraulic pressure to wheel cylinders to generate braking force in each wheel cylinder. The electric hydraulic brake makes it easy to individually control the braking force generated in each wheel brake, so that a function such as an electronic stability control (ESC) system or an anti-lock brake system (ABS) can be easily implemented.

The ESC is intended to stably maintain the posture of a vehicle when the posture of the vehicle is unstable during driving. The cause of the unstable posture of the vehicle includes a road condition with a slippery road surface due to rain, snow or sand, motion inertia such as abrupt zigzag driving, etc. The ESC system controls the torque of a brake and an engine in a state where the posture of the vehicle is dangerous, thus stably maintaining the posture of the vehicle.

When a main brake system is not normally operated, an autonomous driving vehicle secures a fail-safe function using an auxiliary brake system disposed between the main brake system and the plurality of wheel brakes.

In the case where the auxiliary brake system is added to the main brake system to implement redundancy, the layout of the brake system may become complicated, and the cost and weight of the entire brake system may be increased.

SUMMARY

According to at least one embodiment, the present disclosure provides an electric hydraulic brake including: a plurality of wheel brakes configured to supply braking force to wheels of a vehicle; a reservoir storing brake oil; a master cylinder connected to the reservoir, and operated in conjunction with a main brake motor to generate pressure of the brake oil; a first controller configured to control the main brake motor according to brake input; a hydraulic controller including a pump configured to form pressure of the brake oil in conjunction with an auxiliary brake motor, and a hydraulic block configured to selectively transmit the pressure of the brake oil formed in the master cylinder or the pump to the plurality of wheel brakes; and a second controller configured to control the auxiliary brake motor when the master cylinder or the first controller malfunctions. The hydraulic controller is provided with at least one auxiliary flow path to transmit the brake oil from the reservoir to the pump directly through the at least one auxiliary flow path. The hydraulic block is provided with a first side in which a plurality of ports connected to the flow path are located, and a second side to which the auxiliary brake motor is attached, and at least one side of the hydraulic block is coupled to the master cylinder.

DETAILED DESCRIPTION

In view of the above, the present disclosure provides an electric hydraulic brake, in which a main brake unit and a hydraulic controller are formed in a one-box, thus enhancing the cost competitiveness of the electric hydraulic brake and securing required performance.

The problems to be solved by the present disclosure are not limited to the above-mentioned problems, and other problems which are not mentioned will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, alphanumeric codes such as first, second, i), ii), (a), (b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as 'unit', 'module', and the like refer to one or more units for processing at least one function or operation, which may be implemented by hardware, software, or a combination thereof.

Figure 1:
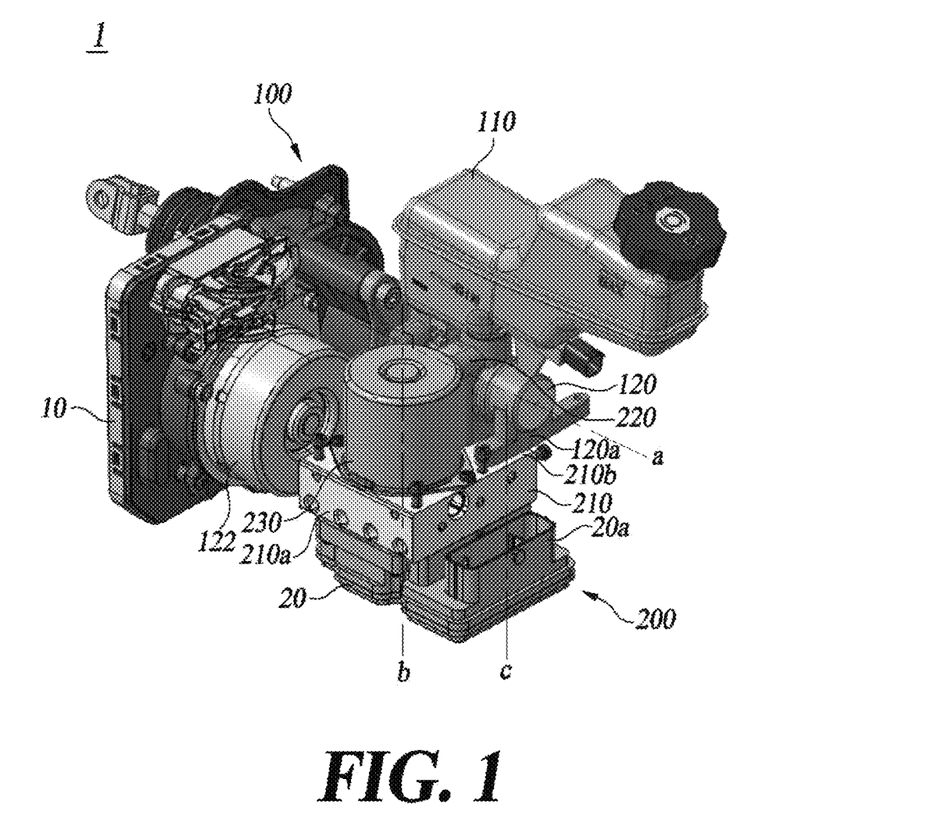
FIG. 1 is a perspective view of an electric hydraulic brake according to an embodiment of the present disclosure.

FIG. 1 is a perspective view of an electric hydraulic brake according to an embodiment of the present disclosure.

Referring to FIG. 1, an electric hydraulic brake 1 according to an embodiment of the present disclosure may include all or some of a reservoir 110, a main brake unit 100, a hydraulic controller 200, a first controller 10, and a second controller 20.

The main brake unit 100 may include a main brake motor 122, a master cylinder 120 configured to change the pressure of brake oil in conjunction with the main brake motor 122, and a reservoir 110 storing the brake oil. In an embodiment of the present disclosure, the main brake motor 122 may be an electric booster.

The hydraulic controller 200 may include all or some of an auxiliary brake motor 230, a plurality of pumps 231 and 232 configured to change the pressure of the brake oil in conjunction with the auxiliary brake motor 230, and a hydraulic block 210 configured to selectively transmit the pressure of the brake oil formed in the master cylinder 120 or the pumps 231 and 232 to a plurality of wheel brakes w1, w2, w3, and w4.

The hydraulic block 210 may include one or more main flow paths 211 and 212 configured to transmit the hydraulic pressure of the brake oil from the master cylinder 120 to the plurality of wheel brakes w1, w2, w3, and w4, one or more auxiliary flow paths 221 and 222 directly connecting the reservoir 110 and the pumps 231 and 232 to transmit the brake oil, and one or more valves.

The hydraulic controller 200 may include one or more auxiliary flow path ports 220 configured so that the auxiliary flow paths 221 and 222 are connected to the reservoir 110 without passing through the master cylinder 120. The auxiliary flow path port 220 may be located in the same housing as the master cylinder 120. The brake oil may be transmitted via the hydraulic block 210 and the connecting block 215 to the plurality of wheel brakes w1, w2, w3, and w4 without passing through the master cylinder 120, using the auxiliary flow path port 220. A connecting block 215 will be described below in detail. In other words, according to an embodiment of the present disclosure, the brake oil may be transmitted from the reservoir 110 to the plurality of wheel brakes w1, w2, w3, and w4 in parallel to the pressure of the brake oil formed in the master cylinder 120, using the auxiliary flow path port 220 and the auxiliary flow paths 221 and 222.

One end of each of the auxiliary flow paths 221 and 222 is connected to the reservoir 110 using the auxiliary flow path port 220 located in the housing of the master cylinder 120. The other end of each of the auxiliary flow paths 221 and 222 is connected to the hydraulic block 210. As a result, the auxiliary flow paths 221 and 222 directly connect the reservoir 110 and the pumps 231 and 232 accommodated in the hydraulic block 210 to guide the brake oil from the reservoir 110 to the pumps 231 and 232.

The hydraulic block 210 may have a cuboid shape. The hydraulic block 210 may be provided with a first side 210*a* in which a plurality of ports connected to the flow path are located, a second side 210*b* to which the auxiliary brake motor 230 is attached, and a third side 210*c* to which the second controller 20 is attached. The second side 210*b* extends from the first side 210*a*. The third side 210*c* is located on an opposite side of the second side 210*b*, and extends from the first side 210*a*.

In the electric hydraulic brake 1 according to an embodiment of the present disclosure, the master cylinder 120 and one or more sides of the hydraulic block 210 may be coupled to each other. The master cylinder 120 may include one or more connecting members 120*a* which hydraulically couple the master cylinder 120 and the hydraulic block 210. That is, by coupling the master cylinder 120 and the hydraulic block 210, the main brake unit 100 and the hydraulic controller 200 may be not coupled via the brake pipe but may be directly physically coupled to each other. In another embodiment, the hydraulic circuit and the components of the main brake unit 100 and the hydraulic controller 200 may be contained in one housing to form the one-box. Since the electric hydraulic brake is configured in the shape of the one-box, the number of valves may be reduced, and an accumulator and a check valve may be eliminated, thus saving cost. Further, the brake piping layout can be simplified.

Referring to FIG. 1, in an embodiment of the present disclosure, the master cylinder 120 and the hydraulic block 210 may be directly coupled to each other using the connecting member 120*a*. The master cylinder 120 may be coupled to the second side 210*b* of the hydraulic block 210. The coupling relationship between the master cylinder 120 and the hydraulic block 210 may be changed in various ways for the convenience of design without being necessarily limited to the layout of FIG. 1. In the case of coupling the master cylinder 120 and the hydraulic block 210, the longitudinal central axis a (see FIG. 1) of the master cylinder 120 and the longitudinal central axis b (see FIG. 1) of the auxiliary brake motor 230 are arranged to be perpendicular to each other.

The first controller 10 is configured to control the main brake motor 122 according to the brake input. The second controller 20 is configured to control the auxiliary brake motor 230 according to the brake input. The first controller 10 and the second controller 20 may be configured to send an electrical signal to an Electronic Parking Brake (EPB). However, the present disclosure is not limited to such a configuration. For example, the first controller 10 may be configured to control the main brake motor 122 and the auxiliary brake motor 230 according to the brake input. Herein, the brake input may be understand as an electronic signal, for example, a pedal sensing signal (PSS), which is generated based on the brake signal provided from a user's pedal input or a separate autonomous driving device. Each of the first controller 10 and the second controller 20 may be an Electronic Control Unit (ECU). The second controller 20 may include a connector 20*a*. In the case of coupling the master cylinder 120 and the hydraulic block 210 to each other, the longitudinal central axis b (see FIG. 1) of the auxiliary brake motor 230 and the direction c (see FIG. 1) of the connector 20*a* of the second controller 20 are arranged to be parallel to each other.

Figure 2:
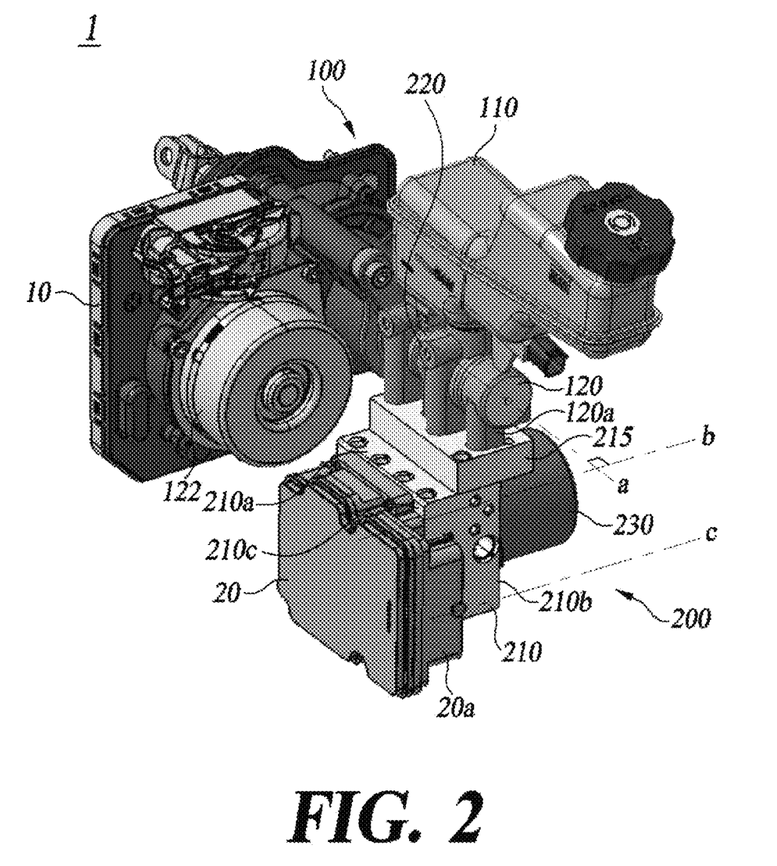
FIG. 2 is a perspective view of an electric hydraulic brake according to an embodiment of the present disclosure.

FIG. 2 is a perspective view of an electric hydraulic brake according to an embodiment of the present disclosure.

Figure 3:
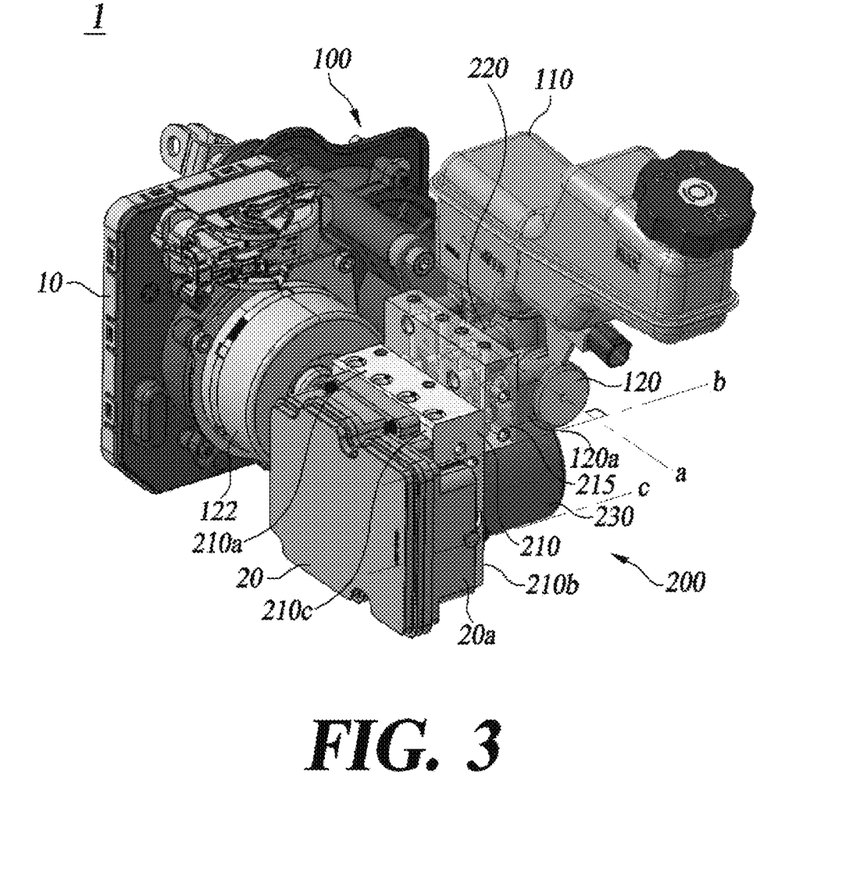
FIG. 3 is a perspective view of an electric hydraulic brake according to an embodiment of the present disclosure.

FIG. 3 is a perspective view of an electric hydraulic brake according to an embodiment of the present disclosure.

Referring to FIGS. 2 and 3, an electric hydraulic brake 1 according to an embodiment of the present disclosure may include a connecting block 215. The connecting block 215 is located between the master cylinder 120 and the hydraulic block 210 to indirectly couple the master cylinder 120 and the hydraulic block 210. The connecting block 215 may have one or more flow paths which guide brake oil and one or more valves therein. The connecting block 215 serves to hydraulically connect the master cylinder 120 and the hydraulic block 210. The connecting block 215 may have a cuboid shape.

Referring to FIGS. 2 and 3, one side of the connecting block 215 is coupled to the master cylinder 120. Among sides other than the side coupled to the master cylinder 120, one or more sides may be coupled to the hydraulic block 210. The connecting block 215 may be coupled to a first side 210*a* or a second side 210*b* of the hydraulic block 210. The coupling relationship between the master cylinder 120, the connecting block 215, and the hydraulic block 210 may be changed in various ways for the convenience of design without being necessarily limited to the layout of FIG. 2 or FIG. 3.

Even in the case of forming the layout using the master cylinder 120, the connecting block 215, and the hydraulic block 210, the longitudinal central axis b (see FIGS. 2 and 3) of the master cylinder 120 and the longitudinal central axis b (see FIGS. 2 and 3) of the auxiliary brake motor 230 are arranged to be perpendicular to each other. Further, the longitudinal central axis b (see FIGS. 2 and 3) of the auxiliary brake motor 230 and the direction c (see FIGS. 2 and 3) of the connector 20a of the second controller 20 are arranged to be parallel to each other.

Figure 4:
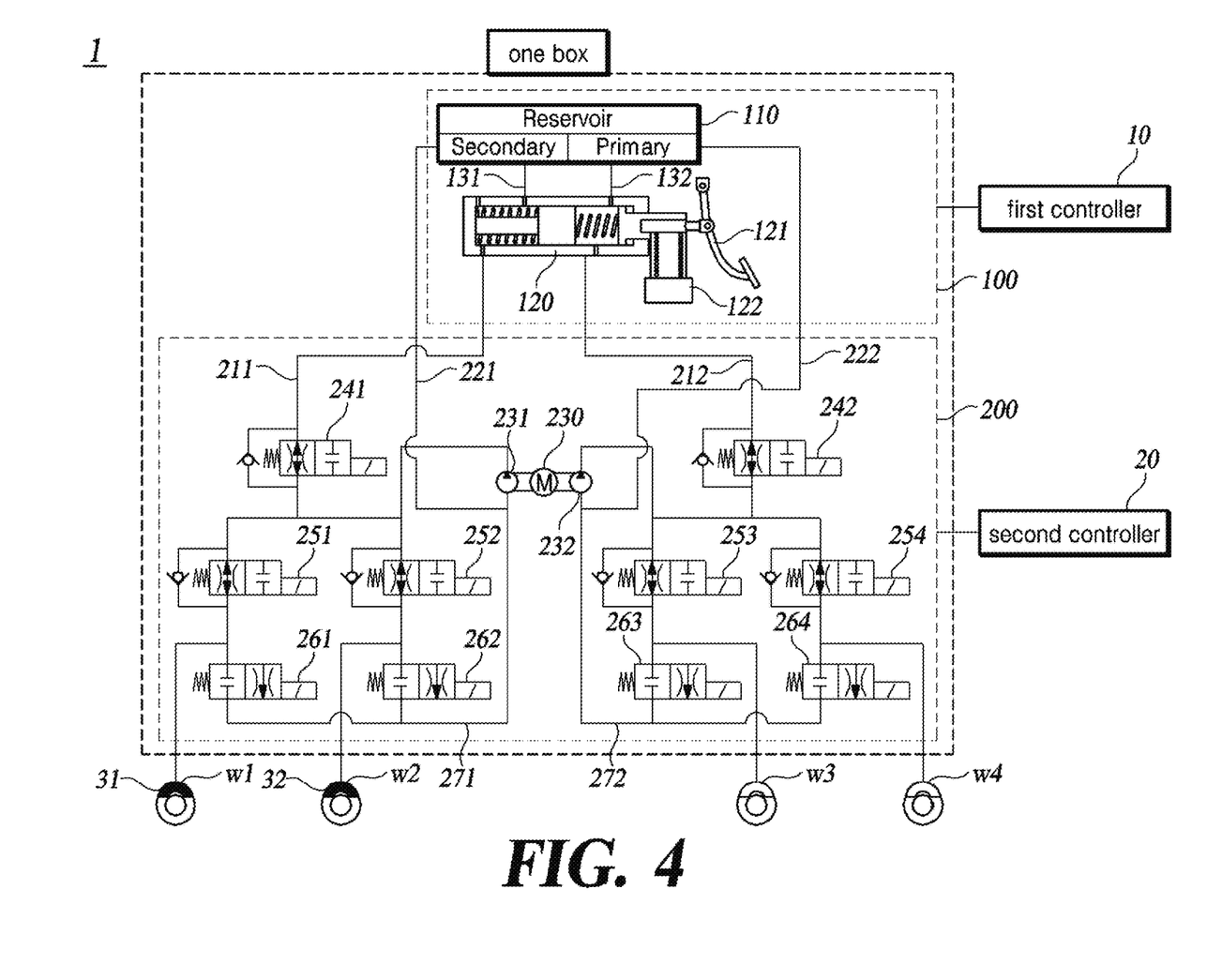
FIG. 4 is a hydraulic circuit diagram of an electric hydraulic brake according to an embodiment of the present disclosure.

FIG. 4 is a hydraulic circuit diagram of an electric hydraulic brake according to an embodiment of the present disclosure.

Referring to FIG. 4, an electric hydraulic brake 1 according to an embodiment of the present disclosure may include all or some of a plurality of wheel brakes w1, w2, w3, and w4 which supply braking force to the wheels of a vehicle, a main brake unit 100, a hydraulic controller 200, a first controller 10, and a second controller 20.

The main brake unit 100 may include a main brake motor 122, a master cylinder 120 configured to change the pressure of brake oil in conjunction with the main brake motor 122, a reservoir 110 storing the brake oil, and a plurality of supply flow paths 131 and 132 supplying the brake oil from the reservoir 110 to the master cylinder 120. In an embodiment of the present disclosure, the main brake motor 122 may be an electric booster.

The hydraulic controller 200 may include an auxiliary brake motor 230, a plurality of pumps 231 and 232 configured to change the pressure of the brake oil in conjunction with the auxiliary brake motor 230, one or more main flow paths 211 and 212 configured to transmit the hydraulic pressure of the brake oil from the master cylinder 120 to the plurality of wheel brakes w1, w2, w3, and w4, one or more auxiliary flow paths 221 and 222 directly connecting the reservoir 110 and the pumps 231 and 232 to transmit brake oil, and one or more valves configured to selectively transmit the pressure of the brake oil formed in the master cylinder 120 or the pumps 231 and 232 to the plurality of wheel brakes w1, w2, w3, and w4.

The hydraulic controller 200 is in fluid communication with the reservoir 110, the master cylinder 120, the pumps 231 and 232, the plurality of wheel brakes w1, w2, w3, and w4, and responds to the signal of the first controller or the second controller. The hydraulic controller 200 is configured to change an internal flow path, namely, a path on which the hydraulic pressure acts or along which the brake oil flows between the reservoir 110, the master cylinder 120, the pumps 231 and 232, and the plurality of wheel brakes w1, w2, w3, and w4.

The plurality of wheel brakes w1, w2, w3, and w4 are configured to apply the braking force to the wheels of the vehicle using the hydraulic pressure. Each of the wheel brakes w1, w2, w3, and w4 may be a caliper brake. The plurality of wheel brakes w1, w2, w3, and w4 may be selectively in fluid communication with at least one of the reservoir 110, the master cylinder 120, and the pumps 231 and 232 using the hydraulic controller 200. For example, the hydraulic pressure generated in the master cylinder 120 or the pumps 231 and 232 may be applied to the plurality of wheel brakes w1, w2, w3, and w4 using the hydraulic controller 200. The plurality of wheel brakes w1, w2, w3, and w4 may apply the braking force corresponding to the hydraulic pressure to the wheels of the vehicle.

The master cylinder 120 is configured to change the pressure of the brake oil in response to the signal of the first controller 10. The master cylinder 120 has a hollow structure therein. The master cylinder 120 includes a piston disposed therein, and two hydraulic chambers partitioned by the piston. The piston is configured to move to one side as the main brake motor 122 is rotated, that is, to reciprocate and translate between the hydraulic chambers. When the main brake motor is moved clockwise or counterclockwise in response to the signal of the first controller 10, the piston may move to one side or the other side to press the brake oil filled in the two hydraulic chambers.

The pumps 231 and 232 are configured to change the pressure of the brake oil in response to the signal of the second controller 20. The pumps 231 and 232 may have the structure of an oil pump. For example, the pumps may be configured to pump the brake oil in conjunction with the rotation of the auxiliary brake motor 230 as the auxiliary brake motor 230 is operated in response to the signal of the second controller 20. The flow path of the brake oil passing through the pumps 231 and 232 may lead to the plurality of wheel brakes w1, w2, w3, and w4 using the hydraulic controller 200.

The hydraulic controller 200 of the electric hydraulic brake 1 according to an embodiment of the present disclosure includes all or some of a plurality of traction control valves 241 and 242, a plurality of inlet valves 251 to 254, and a plurality of outlet valves 261 to 264, which are related to the operation of the master cylinder 120 and the pumps 231 and 232. The traction control valves 241 and 242 and the inlet valves 251 to 254 may be a normal open type solenoid valve, while the outlet valves 261 to 264 may be a normal close type solenoid valve.

The hydraulic controller 200 includes four pairs of inlet valves 251 to 254 and outlet valves 261 to 264 disposed on the brake flow path through which the brake oil is directly supplied to or discharged from each of the wheel brakes w1, w2, w3, and w4. Further, the hydraulic controller 200 includes the first traction control valve 241 and the second traction control valve 242 for distributing the hydraulic pressure generated from the master cylinder 120 onto each brake flow path. The traction control valves 241 and 242 are configured to open or close the main flow paths 211 and 212 between the master cylinder 120 and the plurality of wheel brakes w1, w2, w3, and w4, and to regulate hydraulic pressure transmitted to the plurality of wheel brakes w1, w2, w3, and w4.

The plurality of valves are configured to independently control the braking force of the plurality of wheel brakes w1, w2, w3, and w4, respectively. For example, the valves are configured to implement the functions of the ABS (Anti-lock Brake System), TCS (Traction Control system), and ESC (Electronic Stability Control).

The hydraulic controller 200 of the electric hydraulic brake 1 according to an embodiment of the present disclosure includes a plurality of auxiliary flow paths 221 and 222 which directly guide the brake oil supplied from the reservoir 110 to the pumps 231 and 232 without passing through the master cylinder 120. The hydraulic controller 200 may include a plurality of return flow paths 271 and 272 which directly guide the brake oil to the reservoir 110 without passing through the master cylinder 120 when the electric hydraulic brake 1 is depressurized.

When the master cylinder 120 or the first controller 10 malfunctions, the auxiliary brake motor 230 of the pumps 231 and 232 is operated in response to the signal of the second controller 20. The pumps 231 and 232 operated in conjunction with the auxiliary brake motor 230 transmit the brake oil from the reservoir 110 to the plurality of wheel brakes w1, w2, w3, and w4 using the auxiliary flow paths 221 and 222. The brake oil is transmitted to the plurality of wheel brakes w1, w2, w3, and w4, so that effective auxiliary braking may be achieved by electronic control in an auxiliary braking situation.

Further, when the master cylinder 120 or the first controller 10 malfunctions in a situation where a brake pedal is released, the outlet valves 261 to 264 are controlled in response to the signal of the second controller 20, and the brake oil is transmitted to the reservoir 110 using the return flow paths 271 and 272 without passing through the master cylinder 120.

In consideration of the possibility that a device performing the function of the electric hydraulic brake may malfunction, the possibility that a problem occurs due to the malfunction of the electric hydraulic brake may be eliminated by further including an additional device having a similar function. In other words, a brake device in which redundancy is ensured can be realized. For example, even if the malfunction of the main brake unit occurs in a situation where a driver's driving is excluded or driving attention is reduced, such as smart cruise control or autonomous driving, it is possible to appropriately provide auxiliary braking force.

The electric hydraulic brake according to an embodiment of the present disclosure may further include Electronic Parking Brakes (EPB) 31 and 32 mounted on one or more wheels. In an embodiment of the present disclosure, the electronic parking brakes 31 and 32 are exemplified as being integrally mounted on the two wheel brakes w1 and w2 of the rear wheels. The two electronic parking brakes 31 and 32 may be configured to be controlled by the electrical signals of the first controller 10 and the second controller 20.

For example, when the main brake unit 100 malfunctions, the hydraulic controller 200 and the EPBs 31 and 32 perform braking. When the hydraulic controller 200 malfunctions, the main brake unit 100 and the EPBs 31 and 32 perform braking. When the EPBs 31 and 32 malfunction, the main brake unit 100, the hydraulic controller 200, and the EPBs 31 and 32 may be hydraulically and electrically configured such that the main brake unit 100 and the hydraulic controller 200 may perform a redundancy function.

According to an embodiment, an electric hydraulic brake is advantageous in that a brake system is formed in a one-box, thus simplifying a brake piping layout, reducing the number of components, and thereby reducing cost.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An electric hydraulic brake comprising:
   a plurality of wheel brakes supplying braking force to wheels of a vehicle;
   a reservoir storing brake oil;
   a master cylinder connected to the reservoir, and operated in conjunction with a main brake motor to generate pressure of the brake oil;
   a first controller configured to control the main brake motor according to brake input;
   a hydraulic controller comprising a pump configured to form pressure of the brake oil in conjunction with an auxiliary brake motor, and a hydraulic block configured to selectively transmit the pressure of the brake oil formed in the master cylinder or the pump to the plurality of wheel brakes; and
   a second controller configured to control the auxiliary brake motor when the master cylinder or the first controller malfunctions,
   wherein the hydraulic controller is provided with at least one auxiliary flow path to transmit the brake oil from the reservoir to the pump directly through the at least one auxiliary flow path, and
   wherein the hydraulic block is provided with a first side in which a plurality of ports connected to the flow path are located, and a second side to which the auxiliary brake motor is attached, and at least one side of the hydraulic block is coupled to the master cylinder,
   wherein the master cylinder is fixedly coupled to the first side or the second side of the hydraulic block.

2. The electric hydraulic brake of claim 1, wherein the hydraulic control unit further comprises a connector, and
   wherein the connector is perpendicularly coupled to the second controller, and is disposed such that a direction of the connector is parallel to a longitudinal central axis of the auxiliary brake motor.

3. The electric hydraulic brake of claim 1, wherein the master cylinder further comprises:
   at least one connecting member hydraulically connecting the master cylinder and a side of the hydraulic block.

4. The electric hydraulic brake of claim 1, wherein the auxiliary flow path further comprises at least one auxiliary flow path port configured to be connected to the reservoir without passing through the master cylinder, and
   wherein the auxiliary flow path port is located in the same housing as the master cylinder, and is configured in parallel to the master cylinder.

5. The electric hydraulic brake of claim 1, wherein the hydraulic block comprises a plurality of flow paths guiding the brake oil and a plurality of valves therein.

6. The electric hydraulic brake of claim 1, further comprising:
   a connecting block located between the master cylinder and the hydraulic block, and configured to indirectly couple the master cylinder and the hydraulic block.

7. The electric hydraulic brake of claim 6, wherein the connecting block hydraulically connects the master cylinder and the hydraulic block.

8. The electric hydraulic brake of claim 6, wherein the connecting block comprises a plurality of flow paths guiding the brake oil and a plurality of valves therein.

9. The electric hydraulic brake of claim 6, wherein the connecting block is fixedly coupled to the first side or the second side of the hydraulic block.

10. The electric hydraulic brake of claim 1, further comprising:
    an electronic parking brake (EPB),
    wherein the first controller is configured to send an electrical signal to the EPB, when the master cylinder or the first controller malfunctions.

11. The electric hydraulic brake of claim 1, further comprising:
    an EPB,
    wherein the second controller is configured to send an electrical signal to the EPB, when the hydraulic control unit or the second controller malfunctions.

12. An electric hydraulic brake comprising:
    a plurality of wheel brakes supplying braking force to wheels of a vehicle;
    a reservoir storing brake oil;
    a master cylinder connected to the reservoir, and operated in conjunction with a main brake motor to generate pressure of the brake oil;

a first controller configured to control the main brake motor according to brake input;

a hydraulic controller comprising a pump configured to form pressure of the brake oil in conjunction with an auxiliary brake motor, and a hydraulic block configured to selectively transmit the pressure of the brake oil formed in the master cylinder or the pump to the plurality of wheel brakes; and a second controller configured to control the auxiliary brake motor when the master cylinder or the first controller malfunctions, wherein the hydraulic controller is provided with at least one auxiliary flow path to transmit the brake oil from the reservoir to the pump directly through the at least one auxiliary flow path, wherein the hydraulic block is provided with a first side in which a plurality of ports connected to the flow path are located, and a second side to which the auxiliary brake motor is attached, and at least one side of the hydraulic block is coupled to the master cylinder, and wherein a longitudinal central axis of the master cylinder and a longitudinal central axis of the auxiliary brake motor are arranged to be perpendicular to each other.

13. An electric hydraulic brake comprising:

a plurality of wheel brakes supplying braking force to wheels of a vehicle;

a reservoir storing brake oil;

a master cylinder connected to the reservoir, and operated in conjunction with a main brake motor to generate pressure of the brake oil;

a first controller configured to control the main brake motor according to brake input;

a hydraulic controller comprising a pump configured to form pressure of the brake oil in conjunction with an auxiliary brake motor, and a hydraulic block configured to selectively transmit the pressure of the brake oil formed in the master cylinder or the pump to the plurality of wheel brakes; and a second controller configured to control the auxiliary brake motor when the master cylinder or the first controller malfunctions, wherein the hydraulic controller is provided with at least one auxiliary flow path to transmit the brake oil from the reservoir to the pump directly through the at least one auxiliary flow path, wherein the hydraulic block is provided with a first side in which a plurality of ports connected to the flow path are located, and a second side to which the auxiliary brake motor is attached, and at least one side of the hydraulic block is coupled to the master cylinder, and wherein the second controller is attached to a third side located on an opposite side of the second side of the hydraulic block.

* * * * *